United States Patent
Jaswal et al.

(10) Patent No.: US 10,810,166 B2
(45) Date of Patent: Oct. 20, 2020

(54) RECONCILIATION OF DATA IN A DISTRIBUTED SYSTEM

(71) Applicant: PAYPAL, INC., San Jose, CA (US)

(72) Inventors: Junaid Zaheer Jaswal, Singapore (SG); Dmitry Martyanov, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 210 days.

(21) Appl. No.: 16/136,770

(22) Filed: Sep. 20, 2018

(65) Prior Publication Data

US 2020/0097567 A1 Mar. 26, 2020

(51) Int. Cl.
| | | |
|---|---|---|
| G06F 12/00 | (2006.01) | |
| G06F 16/178 | (2019.01) | |
| G06F 11/14 | (2006.01) | |
| G06F 3/06 | (2006.01) | |
| G06F 11/20 | (2006.01) | |

(52) U.S. Cl.
CPC ......... *G06F 16/178* (2019.01); *G06F 3/0601* (2013.01); *G06F 11/14* (2013.01); *G06F 11/2053* (2013.01)

(58) Field of Classification Search
CPC ...... G06F 3/065; G06F 3/0629; G06F 3/0604; G06F 3/0644
See application file for complete search history.

(56) References Cited

U.S. PATENT DOCUMENTS

2017/0279801 A1 * 9/2017 Andrade ................. H04L 63/08

OTHER PUBLICATIONS

Aerospike, "Aerospike Homepage", 11 pages [online], [retrieved on Jul. 23, 2018]. Retrieved from the Internet: <URL:https://www.aerospike.com/>.
Aerospike, "Configuration Reference", 51 pages [online], [retrieved on Jul. 23, 2018]. Retrieved from the Internet: <URL:https://www.aerospike.com/docs/reference/configuration#xdr-ship-bins>.
Aerospike, "Conflict-resolution-policy setting usage", Jan. 9, 2015, 1 page [online], [retrieved on Jul. 23, 2018]. Retrieved from the Internet: <URL:https://discuss.aerospike.com/t/conflict-resolution-policy-setting-usage/818/print.
Martyanov, Dmitry, "CRDT for Data Consistency in Distributed Environment", Nov. 14, 2017, 7 pages [online], [retrieved on Jul. 23, 2018]. Retrieved from the Internet: <URL:https://medium.com/@dmitrymartyanov/crdt-for-data-consistency-in-distributed-environment-ddb8dfdbc396>.
Wikipedia, "Conflict-free replicated data type", May 7, 2018, 6 pages [online], [retrieved on Jul. 23, 2018]. Retrieved from the Internet: <URL:https://en.wikipedia.org/wiki/Conflict-free_replicated_data_type>.

* cited by examiner

*Primary Examiner* — Arvind Talukdar
(74) *Attorney, Agent, or Firm* — Haynes and Boone LLP

(57) ABSTRACT

Methods and systems are presented for providing data consistency in a distributed data storage system using an eventual consistency model. The distributed data storage system may store data across multiple data servers. To process a request for writing a first data value for a data field, a first data server may generate, for the first data value, a first causality chain representing a data replacement history for the data field leading to the first data value. The first data server may insert the first data value without deleting pre-existing data values from the data field. To process a data read request, multiple data values corresponding to the data field may be retrieved. The first data server may then select one data value based on the causality chains associated with the multiple data values for responding to the data read request.

20 Claims, 8 Drawing Sheets

Data Server 105b (2) Sync -> [A(x1)]
(3) Read -> [A(x1)]
(4) Write B -> [A(x1), B(y1|x1)]

Data Server 105a (1) Write A -> [A(x1)]
(5) Read -> [A(x1)]
(6) Write C -> [A(x1), C(x2|x1)]
(7) Read -> [C(x2|x1)]
(8) Write D -> [C(x2|x1), D(x3|x2)]
(9) Sync -> [A(x1), B(y1|x1), C(x2|x1), D(x3|x2)]
(10) Read -> [B(y1|x1), D(x3|x2)]

RECONCILIATION OF DATA IN A DISTRIBUTED SYSTEM

BACKGROUND

The present specification generally relates to data management systems, and more specifically, to reconciliation of data in a distributed data storage system according to various embodiments of the disclosure.

RELATED ART

Distributed data storage systems may be implemented to improve data access speed and performance. In a distributed data storage system, data is often replicated and stored across multiple data servers in different regions, such that data requests can be serviced by the closest data servers to achieve a faster response time. However, since the same data may be accessed and possibly updated by different data servers, the distributed data storage system should implement processes to ensure that the data provided to users is accurate and consistent.

Conventional approaches based on various types of data locking mechanisms may be utilized to ensure data accuracy and consistency. However, implementing data locking mechanisms in a distributed environment can be expensive (e.g. computationally and/or with respect to latency or throughput). Furthermore, many data locking mechanisms require communications across the multiple data servers every time data is access at any one of the data servers, which substantially reduces the performance gained by having a distributed storage system. Thus, there is a need for a low-cost and high-performance technique for reconciling data in a distributed data storage system.

Figure 1:
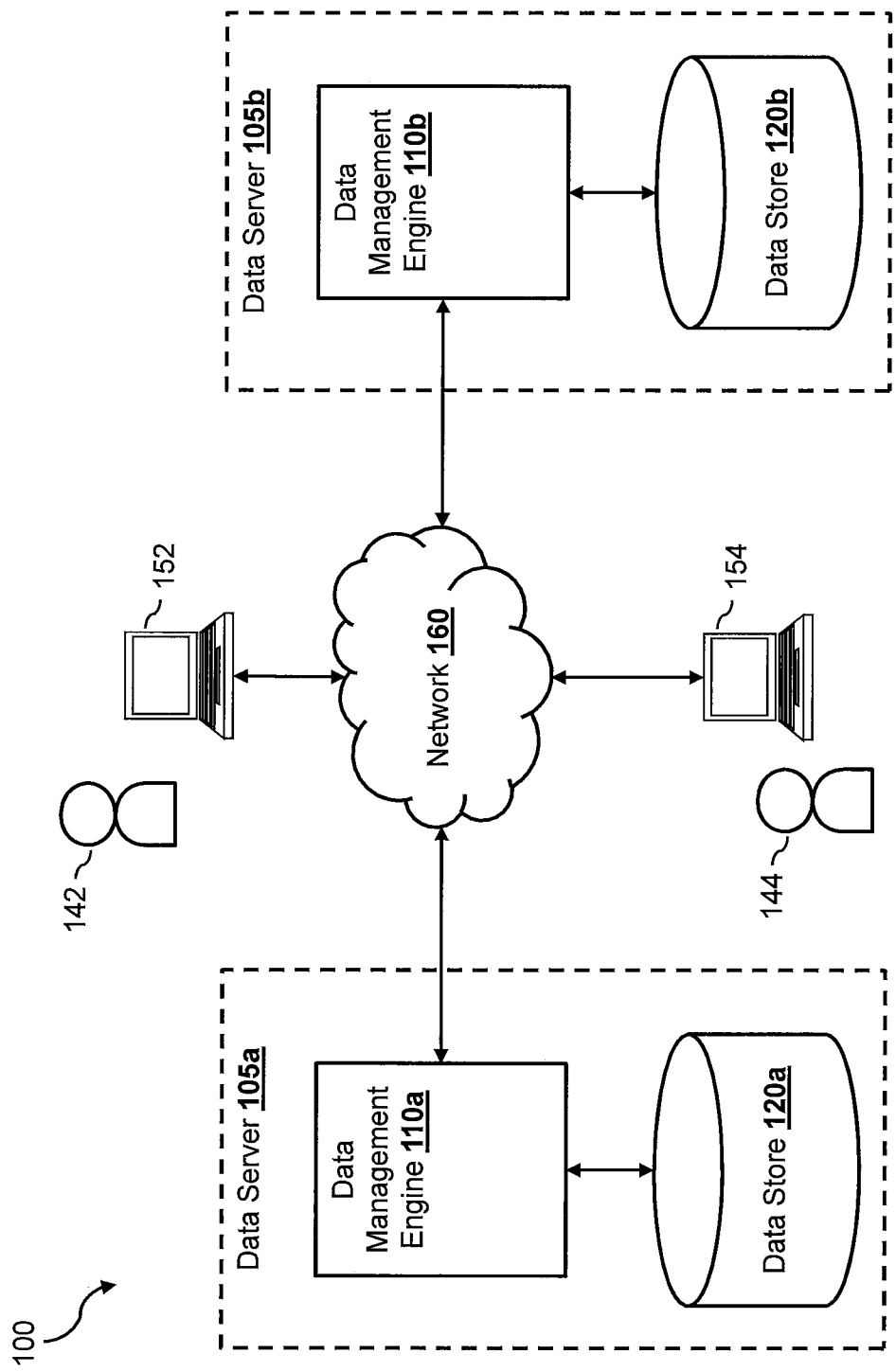
FIG. 1 is a block diagram illustrating a distributed data storage system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing data consistency in a distributed data storage system using an eventual consistency model. The distributed data storage system may include multiple data servers. Data may be replicated and stored across the multiple data servers to service data requests. For example, when a data request is received by the distributed data storage system, a particular data server may be selected to service the data request based on one or more factors (e.g., a geographical location of a device that initiated the data request) to improve the response time for servicing the data request. As such, at any given time, data may be updated by one or more of the multiple data servers.

As discussed above, implementing a data locking mechanism in a distributed environment to ensure that consistent data is provided to users can be expensive in terms of time for servicing a data request. Specifically, a data locking mechanism may require that a data field (or an entire database) across the multiple data servers is locked upon receiving a data request and remain locked until the data request is processed. As such, multiple signals (e.g., a data locking signal and a return acknowledgement signal) have to be communicated across the multiple data servers before the data server can process the data access request, which substantially increases the time for servicing a data access request. Thus, requiring signals to be communicated across the multiple data servers every time a data access request is received detrimentally affects the performance of the distributed data storage system. Furthermore, data requests corresponding to the data field or to the database cannot be serviced during the time when the data field and/or the database is locked, which further reduces the performance and availability of the distributed data storage system.

As such, in some embodiments, the distributed data storage system may adopt an approach based on an eventual consistency model, which does not require locking of any data fields or databases within the distributed data storage system when servicing a data access request. The data access request may be a data write request (e.g., a request for inserting or replacing data) or a data read request (e.g., a request for accessing a data stored in the distributed data storage system), for example. When a data write request is received from a requesting device, the distributed data storage system may select, from the multiple data servers, a data server (e.g., a first data server) to process the data write request.

Under the an eventual consistency approach, the first data server may process the data write request and may return a confirmation indicating a completion of the data write request to the requesting device without locking any data fields or database, or requiring communication with the other data servers. In particular, upon receiving the data write request for writing a data value in a data field, the first data server may generate a causality chain for the data value representing a chain of data replacements (e.g., a data replacement history) related to the data field leading up to the data value. The first data server may insert the data value and the causality chain into the data field without deleting any other data value that pre-existed in the data field. Thus, multiple data values may be stored for the data field after multiple data write operations are performed. Upon receiving a data read request for the data field, the first data server may reconcile the multiple data values in the data field based on the causality chains associated with the data values, and select one data value for responding to the data read request.

In some embodiments, a data write request may include an identifier identifying a data field (e.g., a primary key and a name of the data field) and a first data value to be written for the data field. To process the data write request, the first data server of some embodiments may write the first data value and a first causality chain generated for the first data value into the data field without deleting any existing data value in the data field. To generate the first causality chain, in some embodiments, the first data server may determine whether the first data value indicated in the data write request is for a replacement of an existing data value (e.g., a second data value) corresponding to the data field during the processing of the data write request. For example, the first data server may determine that the data write request is for a replacement of the second data value when the data write request includes the second data value to be replaced. In another example, the first data server may determine that the data write request is for a replacement of the second data value when a data read request associated with the data field was received from the requesting device within a predetermined amount of time (e.g., within 5 seconds, within a minute, etc.) from the time that the data write request was received, and that the second data value was produced as a response to the previous data read request.

When it is determined that the data write request is for a replacement of the second data value corresponding to the data field, the data server may generate the first causality chain for the first data value based on the second data value. For example, the data server may generate, for the first data value, the first causality chain that links the first data value to the second data value. Different embodiments of the first data server may implement the link using different techniques. In some embodiments, the first data server may generate, for the first data value, a first data identifier that uniquely identifies the first data value within the particular data field. In one example, the first data identifier may include two components: a first data server identifier identifying the first data server that processes the data write request and a first version number. Specifically, the first data server identifier may uniquely identify the first data server that processes the data write request, among the multiple data servers within the distributed data storage system. The first data identifier may also include the first version number generated by the first data server. For example, the first data server may maintain a counter for every data field in the distributed data storage system, and may increment the counter each time the first data server updates (e.g., inserts) a data value in the data field. As such, the first data server may use the counter as the first version number for the first data identifier.

In some embodiments, the first data server may also extract information from the data write request, and may include the extracted information in the first data identifier. The information extracted from the data write request may include a user identifier that identifies a user who initiated the data write request, a device identifier that identifies the requesting device, location information indicating a geographical location of the requesting device when the data write request was initiated, and possibly other information that can be extracted from the data write request. As such, the first data server may incorporate the extracted information in the first data identifier as well.

Similar to the first data value, the second data value may also be associated with a second data identifier generated in the same manner For example, the second data identifier may have been generated for the second data value by the distributed data storage system, for example, by a data server (e.g., a second data server) that inserts the second data value into the data field. In some embodiments, the first data server may generate the first causality chain by including the second data identifier in the first causality chain. In some embodiments where the second data value is also associated with a second causality chain (e.g., generated for the second data value by the second data server when that inserts the second data value into the data field) comprising link(s) to other data value(s) that the second data value replaced for the data field, the first data server may also include the second causality chain in (e.g., append to the end of) the first causality chain. Thus, the first causality chain represents a data replacement history (or at least a branch of the data replacement history) for the data field leading up to the first data value. In some embodiments, the first data server may encapsulate the first data value and its associated information (e.g., the first data identifier, the first causality chain, and information extracted from the data write request) into a data object for storage in the first data store.

After inserting (e.g., writing) the first data value, the first data identifier, and the first causality chain (or the encapsulated data object) in the data field, the first data server may transmit to the requesting device a confirmation indicating that the data write request has been processed. This way, a data write request can be processed by the distributed data storage system quickly without locking the data field or requiring any communication among the multiple data servers. In other words, using the techniques disclosed herein, processing the data write request associated with the data field by the first data server does not prevent other data servers from concurrently servicing data write requests (even data write requests that affect the same data field). This advantageously speeds up overall operations and allows for greater numbers of reads and writes in distributed data environments, according to various embodiments.

In some embodiments, the distributed data storage system may synchronize the multiple data servers such that data updates performed by one data server may be propagated to the other data servers. For example, the distributed data storage system may schedule periodic synchronizations (e.g., every hour, every day, etc.) among the multiple data servers. As such, during a synchronization, the update to the data field (e.g., writing the first data value and its associated information into the data field) and other data updates performed by the first data server may be propagated (e.g., transmitted) to the other data servers. Similarly, updates to the data field and/or to other data fields performed by another data server may also be transmitted and propagated to the first data server. Consider an example in which a third data value is written (e.g., inserted) into the data field by a third data server based on another data write request prior to the synchronization. In this example, the third data value and its associated information (e.g., a third data identifier associated with the third data value, a third causality chain associated with the third data value, and third information extracted from the data write request associated with the third data value) may be transmitted to the first data server, and the first data server may insert the third data value and its associated information (e.g., in the form of a third data object) into the data field of its local data storage. After the synchronization is performed, every data server should have the same data stored in their local data storage. For example, every data server should have, for the data field, the first data value, the second data value, and the third data values stored.

When the distributed data storage system receives a data read request from a requesting device, the distributed data storage may select, from the multiple data servers, a data server (e.g., the first data server) to process the data read request. Similar to processing the data write request, the first data server may process the data read request without locking the data field or requiring communication with the other data servers. The data read request may include an identifier for the data field (e.g., a primary key and a name of the data field). Based on the identifier, the first data server may retrieve the data (or the data objects) stored for the data field from the local data storage of the first data server. If the first data server determines that only one data value is stored for the data field, the first data server may simply return the one data value in a response to the requesting device. On the other hand, if the first data server determines that multiple data values are stored for the data field, the first data server may determine one data value from the multiple data values for responding to the data read request. In some embodiments, the first data server may select the one data value from the multiple data values based on the causality chains associated with the multiple data values.

Using the example discussed above, the first data server may retrieve the first data value, the second data value, the third data value, and their associated information based on the data read request. To select one data value to respond to the data read request, the first data server may first eliminate one or more data values that would have been replaced during processing of previous data write request(s). In this regard, the first server may examine the causality chains of the data values to determine which data value(s) has been replaced during processing of previous data write request(s). Since the causality chains identify a chain of updates (replacements) for the data field, the first data server may determine that a data value has been replaced during processing of previous data write request(s) when the data value is linked in one or more chain of updates (e.g., the data identifier of the data value appears in one or more causality chains) corresponding to the data field. By examining the causality chains of the first, second, and third data values, the first data server may determine that the second data value has been replaced by the first data value, as the second data identifier is included in the first causality chain. Thus, the first data server may eliminate the second data value from the data field based on determining that the second data identifier is included in the first causality chain.

In some embodiments, the first data server may also determine that a data value has been replaced during processing of previous data write request(s) when the data identifier of the data value is superseded by the data identifier of another data value. As discussed above, a data identifier of a data value includes a data server identifier and a version number. When two data values were generated for (e.g., inserted into) the data field by the same data server, and one data value has a version number that is higher than the other data value, the first data server may determine that one of the two data values (the one having a lower version number) has been replaced by the other one of the two data values (the one having a higher version number). In this example, since both the second data value and the third data value were inserted into the data field by the second data server, the second data identifier and the third data identifier should indicate the same data server (e.g., the second data server). Assuming that the third data value was inserted into the data field after the second data value, the third data identifier should have a higher version number than the second data identifier. Thus, the first data server may also eliminate the second data value from the data field based on determining that the second data identifier is superseded by the third data identifier.

After eliminating the replaced data values, the first data server may provide the remaining data value(s) for the data field to the requesting device as a response to the data read request. However, when it is determined that multiple data values are still remaining after eliminating the replaced data values, the first data server may use additional techniques to select one data value for responding to the data read request. In some embodiments, the first data server may select a data value having a longer causality chain, indicating that a longer update history is associated with the data value. For example, using the example discussed above, the first server may determine that the first causality link of the first data value includes one data identifier (e.g., the second data identifier) and also any data identifiers included in the second causality chain, as it was determined by the first server that the first data value was an explicit replacement of the second data value. On the other hand, the first data server may determine that the third causality chain of the third data value has no data identifier (possibly because when the third data value was written into the data field, it was not indicated by the requesting device that it was a direct replacement of an existing data value in the data field). As such, the first data server may select the first data value to be included in a response for the data read request, and transmit the response to the requesting device.

In some embodiments, the first data server may assign different weights to the different data identifiers in a causality chain. For example, the first server may assign different weights to the different data identifiers in the causality chain based on the information extracted from the respective data write requests (e.g., an identity of a user who initiated the data write request for inserting the corresponding data, a location of the device that initiated the data write request, a type of device that initiated the data write request, etc.). For example, the first data server may assign a higher weight to the data identifier when an administrator initiated the data write request to insert the corresponding data value into the data field, and the first data server may assign a lower weight to the data identifier when a regular account holder initiated the data write request to insert the corresponding data value into the data field. Thus, the first data server may calculate a score for each causality chain, and may then select the data value that has a corresponding causality chain with a highest score.

Thus, the first data server may process the data read request and provide consistent data return by reconciling the data values based on their causality chains without locking the data field or requiring communication with the other data servers.

FIG. 1 illustrates a distributed data storage system 100 according to one embodiment of the disclosure. The distributed data storage system 100 includes multiple data servers (e.g., a data server 105a and a data server 105b). While only two data servers are shown in this figure, it has been contemplated that more data servers may be included in the distributed data storage system 100 without departing from the spirit of the disclosure. The data servers 105a and 105b may be communicatively coupled with each other over a network (e.g., a network 160). The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

As shown, each data server may include a data management engine for processing data access requests and a data store. For example, the data server 105*a* includes a data management engine 110*a* and a data store 120*a,* and the data server 105*b* includes a data management engine 110*b* and a data store 120*b*. Each of the data servers 105*a* and 105*b* may provide processing of data access requests (e.g., data read requests, data write requests, etc.) for the distributed data storage system 100. For example, each of the data servers 105*a* and 105*b* may receive data access requests from user devices 152 and 154 via the network 160 that are initiated by users 142 and 144. In some embodiments, a data access request (e.g., sent by the user device 152 or the user device 154) may be automatically routed by the distributed data storage system 100 to one of the data servers 105*a* and 105*b* based on one or more criteria (e.g., a location of the user device that initiated the data access request, etc.).

Each of the user devices 152 and 154 may be a computing device (e.g., a smart phone, a laptop, a tablet, a personal computer, etc.) used by the corresponding uses 142 and 144 for initiating data access requests. In some embodiments, each of the user devices 152 and 154 may include a web browser for facilitating communication using the hypertext transfer protocol (HTTP). As such, the users 142 and 144 may browse one or more webpages using the user interface provided by the web browser. For example, the user 142 may use the web browser of the user device 152 to browse a webpage associated with the distributed data storage system 100 and initiate a data access request using the interface on the webpage. As such, the data access request initiated by a user device may be included within a HTTP request submitted from the user device via the webpage. The data access request (included in the HTTP request) may be received by a web server (or an application server) associated with the distributed data storage system 100 before being routed to one of the data servers 105*a* and 105*b*.

The distributed data storage system 100 may store data associated with different user accounts with a service provider. In some embodiments, the distributed data system 100 may distribute the data among the data servers 105*a* and 105*b*. For example, the distributed data system 100 may replicate the data and store a copy of the data in each of the data servers 105*a* and 105*b* such that each of the data servers 105*a* and 105*b* may service (e.g., process) data access requests related to the data associated with the different user accounts. The data stored in the data servers 105*a* and 105*b* may include information related to the user accounts, such as a user name, address, e-mail address, an account balance, a status of an application process (e.g., a credit application process, an onboarding application process, etc.), and other information that is related to the user accounts. The distributed data storage system 100 may be associated with a service provider that provides various electronic services to users. For example the service provider may enable (e.g., through an interface such as a webpage) users to perform one or more electronic transactions through their corresponding user accounts. The electronic transactions may include electronic payment transactions, onboarding applications for becoming an authorized merchant, credit applications, and other types of transactions. Throughout the life cycle of a user account, the information related to the user account may be added and/or updated by the user of the user account and/or other personnel such as an administrator of the service provider. For example, the user may add and/or update a mobile phone number by initiating a request to replace the old phone number stored in the distributed data storage system 100 with a new phone number. In another example, when the user initiates an onboarding application to become an authorized merchant, the service provider may store a status of the onboarding application for the user account in the distributed data storage system 100. The user may provide requested documents for the onboarding application, which may change the status of the application (e.g., from a pending documents status to documents received status). Upon reviewing the documents, an administrator of the service provider may further update the status (e.g., from the documents received status to a documents reviewing status, or to an approved or a rejected status, etc.). As such, the changing of statuses may be performed by different entities, and may be processed by different data servers within the distributed data storage system 100.

In some embodiments, the distributed data storage system 100 may implement a particular data structure (e.g., a relational database structure) for storing the data. In the particular data structure, the data may include multiple data sets, where each data set is identifiable using its corresponding primary key, and may correspond to a distinct user account. Furthermore, each data set may include multiple data fields, where each field is associated with a distinct data type (e.g., user name, address, status, etc.). As such, each data access request may include a key (e.g., a primary key) for identifying a particular dataset within the distributed data storage system 100 and optionally a name of the data field. The data server 105*a* or 105*b* may then provide access to the requested data based on the data access request.

The data access request may be a data read request, where the user requests to view a data value that is stored for a particular data field. The data access request may be a data write request, where the user requests to insert a new data value into a data field of a particular data set. For example, the user may request to update the phone number field with a new phone number the user just recently obtained. The data write request may explicitly indicate a replacement of an existing data value with the new data value. For example, the user may first view the existing data value for the data field, using a data read request and then initiate a data write request to insert the new data value. In such instance, the data write request may be associated with the preceding data read request. In some embodiments, the data write request may not indicate a direct replacement to an existing data value, but merely inserting the new data value into the data field.

Figure 2:
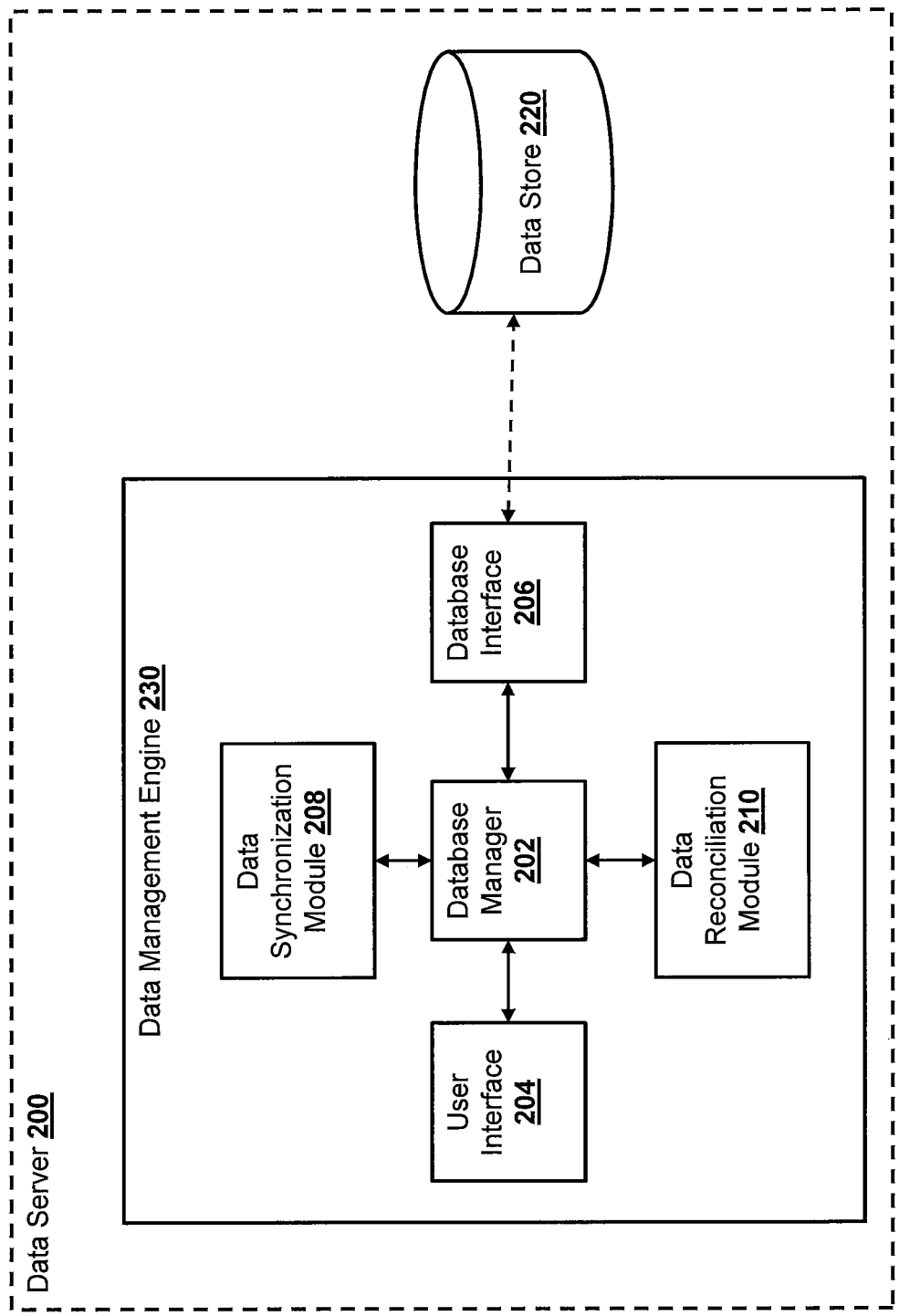
FIG. 2 is a block diagram illustrating a data server within a distributed data storage system according to an embodiment of the present disclosure.

FIG. 2 illustrates a data server 200 according to one embodiment of the disclosure. The data server 200 may be implemented as the data server 105*a* or the data server 105*b,* or both. As shown, the data server 200 includes a data management engine 230, which may be implemented as the data management engine 110*a* and/or the data management engine 110*b,* and a data store 220, which may be implemented as the data store 120*a* and/or the data store 120*b*. The data management engine 230 includes a database manager 202, a user interface 204, a database interface 206, a data synchronization module 208, and a data reconciliation module 210. In some embodiments, the user interface 204 may receive data access requests from users (e.g., the users 142 and 144) via their user devices 152 and 154 through the network 160, and transmit responses to the user devices 152 and 154 through the network 160. The database interface 206 retrieve data from the data store 220 based on one or more data queries. The data synchronization module 208 may perform data synchronization with other data servers (e.g., the data servers 105a and 105b) within the distributed data storage system 100. The data reconciliation module 210 may perform reconciling of data when more than one data value is associated with a data field. For example, based on a data read request associated with the data field that includes multiple data values, the data reconciliation module 210 may determine one of the data values for responding to the data read request using techniques described herein.

Figure 3:
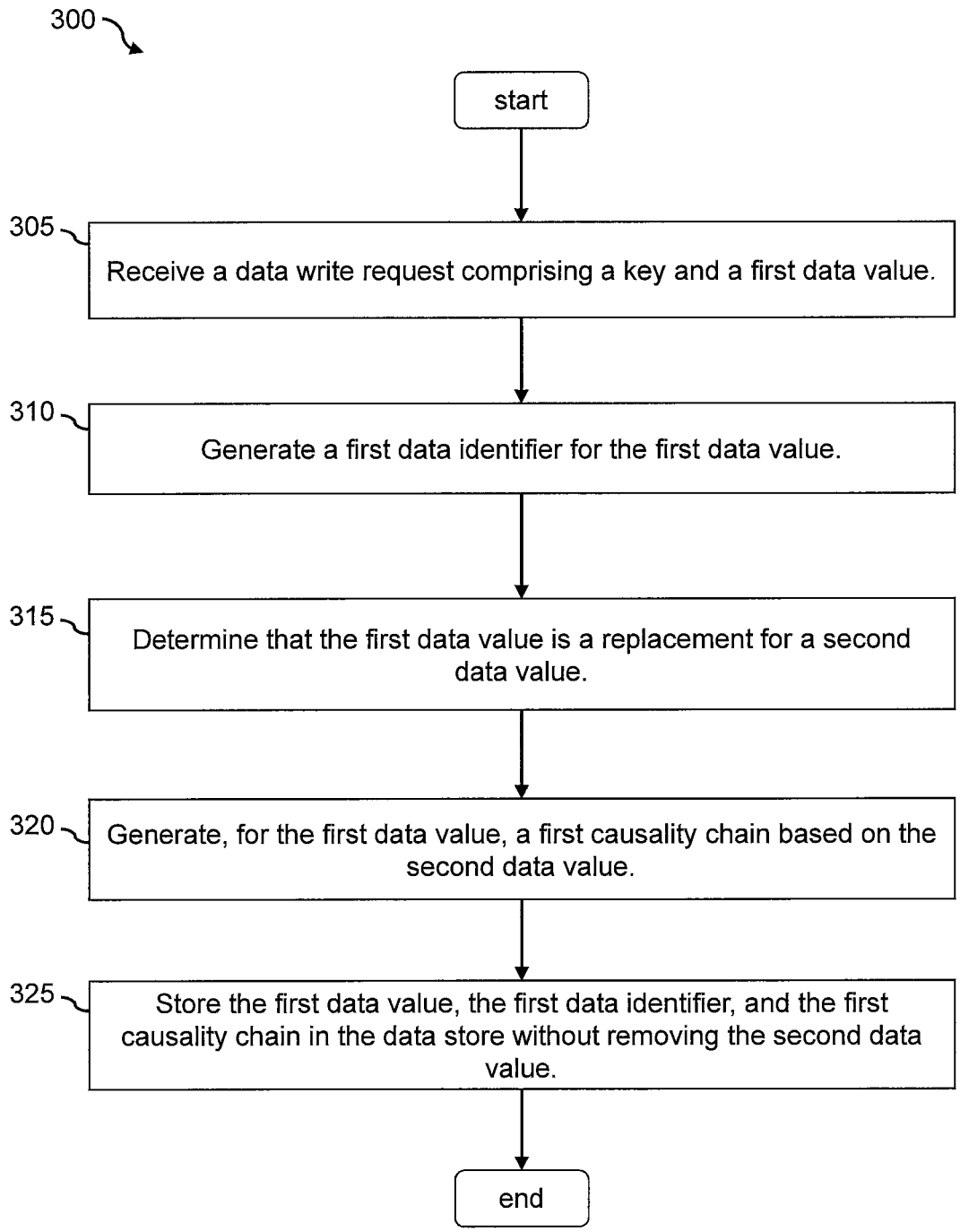
FIG. 3 is a flowchart showing a process of processing a data write request according to an embodiment of the present disclosure.

FIG. 3 illustrates a process 300 for processing a data write request according to various embodiments of the disclosure. In some embodiments, the process 300 may be performed by the data servers 105a, 105b and/or 200. The process 300 begins by receiving (at step 305) a data write request comprising a key and a first data value. For example, the data server 200 may receive, through the user interface 204, a data write request from a user device (e.g., the user device 152 or the user device 154). The data write request may include a primary key that identifies a dataset within the data store 220, a name of the data field (e.g., a phone number, a status of an application, a status of an account, etc.), and a first data value for inserting into the data field.

The process 300 then generates (at step 310) a first data identifier for the first data value. For example, the data management engine 230 may generate a first data identifier for the first data value included in the data write request. The first data identifier is generated to uniquely identify the first data value among data values stored in the data field. In some embodiments, the data management engine 230 may generate the first data identifier based on a data server identifier associated with the data server 200 and a counter maintained by the data server 200 for the data field. As discussed above, the data server 200 may maintain a counter for each data field in the data store 220. The counter may be initialized as zero or one. Each time a new data value is written into the data field (e.g., based on a data write request), the counter corresponding to the data field may increment (e.g., increment by one). In some embodiments, the data management engine 230 may generate the first data identifier further based on the counter corresponding to the data field.

Figure 4:
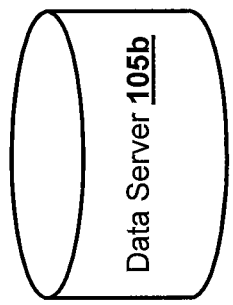
FIG. 4 illustrates a sequence of data operations performed by a distributed data storage system according to an embodiment of the present disclosure.
Figure 4:
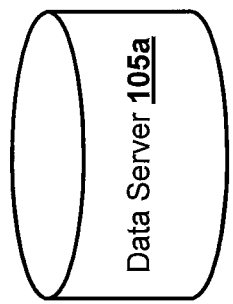

FIG. 4 illustrates a sequence of data write and data read operations performed by the data servers 105a and 105b of the distributed data storage system 100. As shown, the first operation (Operation (1)) is a data write operation that writes the data value 'A' into a particular data field within the distributed data storage system 100, possibly in response to a data write request from a requesting device (e.g., the user device 152). During the processing of the data write request corresponding to Operation (1), the data server 105a (and particularly the data management engine 110a) generates, for the data value 'A', a data identifier based on a data server identifier and a counter. In this example, the data server identifier for the data server 105a is 'x'. Since this is the first data write operation for this particular data field by the data server 105a, the version number (counter) is '1.' As such, the data server 105a generates, for the data value 'A' a data identifier 'x1.'

Operation (4) illustrates another data write request, in which a data value 'B' is requested to be inserted into the particular data field, based on a data write request initiated by another requesting device (e.g., the user device 154). The data server 105b is assigned to process the data write request for the data value 'B'. As such, the data server 105b (and particularly the data management engine 110b) generates, for the data value 'B', a data identifier based on a data server identifier and a counter. In this example, the data server identifier for the data server 105b is 'y'. Since this is the first data write operation for this particular data field by the data server 105b, the version number (counter) is '1.' As such, the data server 105b generates, for the data value 'B' a data identifier 'y1.'

At step 315, the process 300 determines whether the first data value is a replacement for a second data value, and if so, generates (at step 320), for the first data value, a first causality chain based on the second data value. For example, the data management engine 110a may determine whether the data value 'A' is a replacement of any existing data value for the particular data field. In this example, since there is no pre-existing data value stored for the particular data field, the data management engine 110a may determine that the data value 'A' is not a replacement for any other data value. Thus, the data management engine 110a may not generate a causality chain for the data value 'A', or alternatively, may generate an empty (e.g., a null) causality chain for the data value 'A'.

As shown in FIG. 4, after the data value 'A' is inserted into the particular data field by the data server 105a, the distributed data storage system 100 performs a data synchronization operation in Operation (2). During the data synchronization operation, the data value 'A' and its associated information that were inserted in the local data store 120a are propagated to other data servers, including the data server 105b. As such, as part of the data synchronization operation in Operation (2), the data server 105b may receive and store the data value 'A' and its associated information (e.g., the data identifier, the causality chain, etc.) in the local data store 120b. When the data server 105b receives the data write request associated with the data value 'B' in Operation (4), the data value 'A' and its associated information is already stored in the local data store 120b.

The data management engine 110b may determine that the data write request for inserting the data value 'B' for the particular data field is a replacement for the data value 'A'. For example, the data management engine 110b may determine that the data value 'B' is a replacement for the data value 'A' based on the data write request identifying the data value 'A' is to be replaced. In another example, the data server 105b may have received a data read request corresponding to the particular data field in Operation (3) prior to receiving the data write request for inserting the data value 'B' into the particular data field. As such, the data management engine 110b may determine that the data value 'B' is a replacement for the data value 'A' based on determining that the previous data read request was received within a predetermined duration (e.g., 5 seconds, a minute, etc.) before receiving the data write request associated with the data value 'B' and that the data value 'A' was produced as a response to the previous data read request, as indicated in Operation (3).

When it is determined that the data value 'B' is a replacement for the data value 'A' for the particular data field, the data management engine 110b may generate, for the data value 'B' a causality chain that links the data value 'B' with the data value 'A'. For example, the data management engine 110b may include the data identifier for the data value 'A' (e.g., 'x1') in the causality chain generated for the data value 'B'.

The process 300 then stores (at step 325) the first data value, the first data identifier, and the first causality chain in the data store without removing the second data value. For example, based on the data write request associated with the data value 'A' in Operation (1), the data management engine 110a may store the data value 'A', the data identifier 'x1', and a null causality chain for the particular data field in the data store 120a. Upon inserting the data value 'A' and its associated information (e.g., its null causality chain, additional information extracted from the data write request, etc.) for the particular data field in the local data store 120a, the data management engine 110a may transmit a notification to the requesting device (e.g., the user device 152) confirming a completion of the processing of the data write request associated with the data value 'A'.

In Operation (4), based on the data write request associated with the data value 'B', the data management engine 110b may insert the data value 'B', the data identifier 'y1', and the causality chain that includes the data identifier 'x1' into the data field in the data store 120b. Specifically, the data management engine 110 may insert the data value 'B' and its associated information (e.g., its causality chain including the data identifier 'x1', additional information extracted from the data write request, etc.) in the particular data field without deleting any of the pre-existing data stored for the particular data field, including the data value 'A' and its associated information. Once the data value 'B' and its associated information are stored in the local data store 120b for the particular data field, the data management engine 110b may transmit a notification to the requesting device (e.g., the user device 154) confirming a completion of the processing of the data write request associated with the data value 'B'.

By adopting the eventual consistent model, a data server within the distributed data storage system 100 may process a data write request by simply inserting a new data value in its corresponding local data store without removing any pre-existing data values or communicating with the other data servers. Specifically, under the eventual consistent model, the data server does not reconcile the data for the data field while processing the data write request, and instead, delaying the data reconciliation to a later time, for example, when a subsequent data read request associated with the particular data field is received, which will be described in more detail below by reference to FIG. 5. This ensures a fast response time for processing a data write request and availability of the data server and/or other data servers within the distributed data storage system for processing other data access requests while the data write request is being processed.

Figure 5:
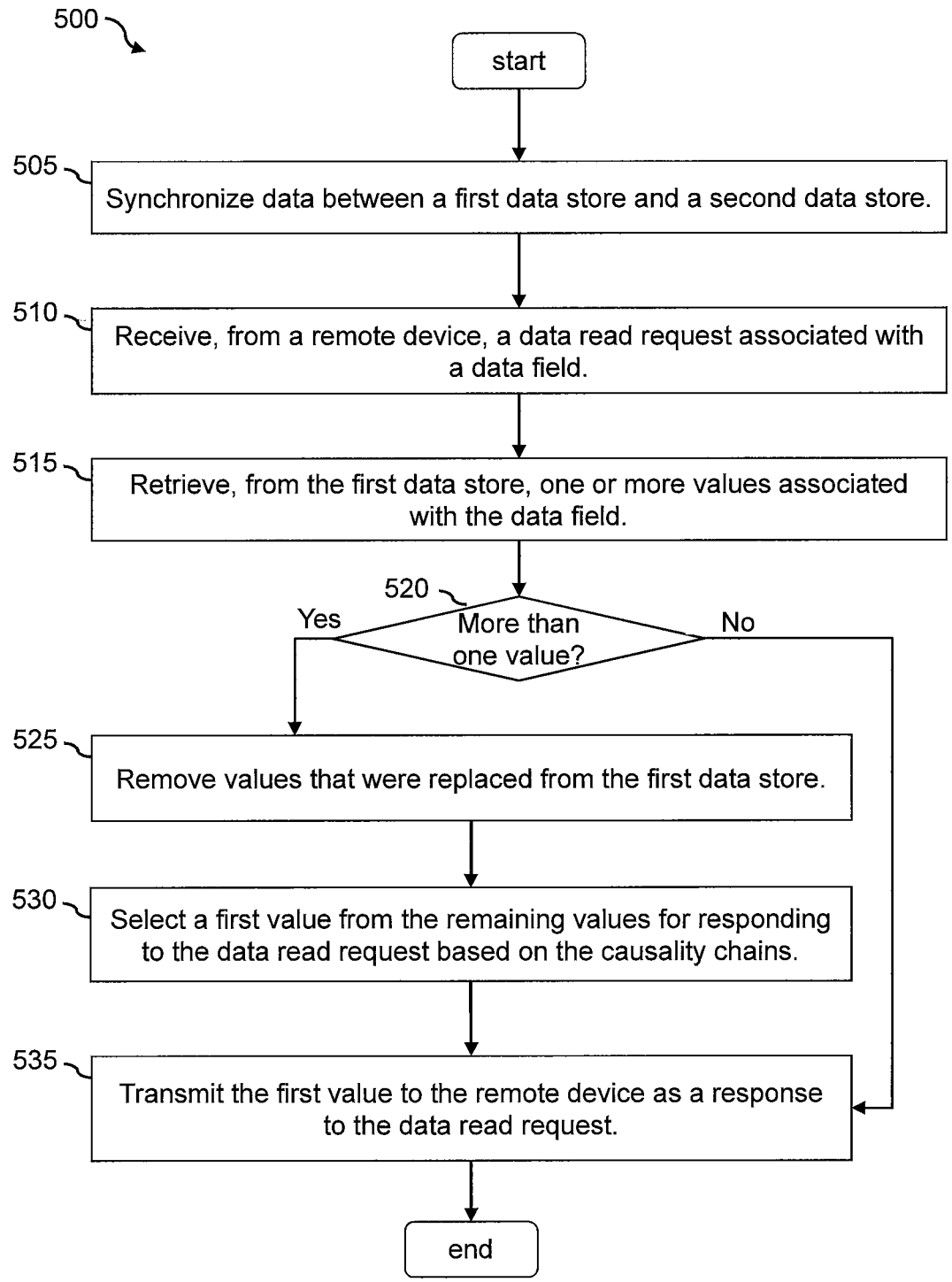
FIG. 5 is a flowchart showing a process of processing a data read request according to an embodiment of the present disclosure.

FIG. 5 illustrates a process 500 for synchronizing data and processing a data read request according to various embodiments of the disclosure. In some embodiments, the process 300 may be performed by one or more of the data servers 105a, 105b and/or 200. The process 500 begins by synchronizing (at step 505) data between a first data store and a second data store. For example, the distributed data storage system 100 may perform a data synchronization operation between the data servers 105a and 105b by transmitting any data updates that occurred by any one of the data servers 105a and 105b since the last data synchronization operation to the other one of the data servers 105a and 105b. Referring back to the data operation sequence in FIG. 4, the distributed data storage system 100 may perform a data synchronization operation, in Operation (2), after the data write request of Operation (1) is processed. In Operation (2), the data server 105a (e.g., the data synchronization module 208) may determine that the particular data field has been updated with the data value 'A' and its associated information in the local data store 120a since the last data synchronization. As such, the data server 105a may transmit the data value 'A' and its associated information (e.g., the data identifier 'x1' and the null causality chain) to the other data servers within the distributed data storage system 100, including the data server 105b. When the data server 105b receives the data update from the data server 105a, the data server 105b may store the data value 'A' and its associated information in its local data store 120b for the particular data field. After the data synchronization operation (Operation (2)) is completed, both the data servers 105a and 105b should have stored, for the particular data field, the data value 'A' and its associated information.

The distributed data storage system 100 may perform another data synchronization operation after the data write request associated with the data value 'B' is completed, as indicated in Operation (5). Prior to Operation (5), the data server 105a only includes the data value 'A' and its associated information stored in the local data store 120a for the particular data field. However, since the data server 105b has updated the particular data field in its local data store 120b with the data value 'B', the data server 105b includes both the data value 'A' and the data value 'B' in its local data store 120b for the particular data field. As such, the data server 105b may determine that the data value 'B' and its associated information were updated after the last data synchronization operation (Operation (2)), and thus may transmit the data value 'B' and its associated information to other data servers within the distributed data storage system 100, including the data server 105a. Upon receiving the data updates from the data server 105b, the data server 105a may insert the data value 'B' and its associated information for the particular data field in its local data store 120a. After the data synchronization operation (Operation (5) is completed, both the data servers 105a and 105b have the data value 'A' and the data value 'B' (and their associated information) in their respective local data stores 120a and 120b.

At step 505, the process 500 receives, from a requesting device, a data read request associated with a data field. For example, any one of the data servers 105a and 105b may receive a data read request from a requesting device (e.g., the user device 152 and/or the user device 154). Referring back to the data operation sequence in FIG. 4, the distributed data storage system 100 may receive data read requests from one or more requesting devices. For example, in Operation (3), a data read request for the particular data field is received and assigned to the data server 105b, and in Operation (6), another data read request for the particular data field is received and assigned to the data server 105a.

The process 500 then retrieves (at step 515), from the first data store, one or more data values associated with the data field. The process 500 determines (at step 520) whether the one or more data values associated with the data field includes more than one data value. If it is determined that only one data value is retrieved for the data field, the process 500 transmits (at step 535) the data value to the requesting device as a response to the data read request. For example, in Operation (3), the data server 105b may retrieve the data value(s) associated with the particular data field based on the data read request. Since Operation (3) occurs after the data synchronization operation in Operation (2), at this time, the data server 105b includes the data value 'A' and its associated value in the local data store 120b. The data server 105b may determine that only the data value 'A', and no other data value, is stored for the particular data field in the local data store 120b, and thus, transmits the data value 'A' to the requesting device (e.g., the user device 154) as a response to the data read request.

However, if it is determined that the data store includes multiple data values associated with the data field, the process 500 selects one data value among the multiple data values for the data read request by removing (at step 525) values that were determined to be replaced from the first data store and selecting (at step 530) a first value from the remaining values based on the causality chains associated with the multiple data values. Consider the data read request in Operation (6) as an example, since Operation (6) occurs after the data synchronization operation in Operation (5), at the time that the data read request is received by the data server 105a, the data server 105a has both the data value 'A' and the data value 'B' stored in its local data store 120a for the particular data field. When the data server 105a determines that multiple data values (e.g., the data value 'A' and the data value 'B') are associated with the particular data field, the data server 105a may select one of the data values for responding to the data read request.

First, the data server 105a may determine whether any of the data values were replaced by other data values, and eliminate the replaced data value(s) from the selection. In some embodiments, the data server 105a may also remove the replaced data value(s) from the local data store, to free up memory space. In some embodiments, the data server 105a (particularly, the data reconciliation module 210) may determine that a data value has been replaced by another data value when the data identifier of the data value appears in a causality chain of another data value. In this example, the data value 'A' has a null causality chain, and the data value 'B' has a causality chain that includes the data identifier 'x1', which is associated with the data value 'A'. As such, the data server 105a may determine that the data value 'A' has been replaced by the data value and eliminate the data value 'A' from the selection.

In some embodiments, the data server 105a may also select one data value from the multiple data values associated with the particular data field based on the causality chains of the multiple data values. For instance, since the length of the causality chain represents the number of conscious replacements of data in the particular data field, a longer causality chain may indicate that the updating history leading to the corresponding data value has been more carefully vetted. As such, the data server 105a may select a data value having the longest causality chain. In the example given above, between the data value 'A' having a null causality chain and the data value 'B' having a causality chain with one data identifier, the data server 105a may also select the data value 'B' using this method.

However, all replacements may not be equal. For example, a data update (replacement) performed by someone who is in a higher authority position should weigh more than another data update performed by someone who is in a lower authority position. Also, a data update initiated by a device located in one geographical location may weight higher than another data update initiated by another device located in another geographical location. Consider an example, in which the particular data field is associated with a particular user account. The data server 105a may determine that the user associated with the particular user account lives in the United States and rarely travels outside of the country. Furthermore, the user has been using an Apple® computer product for updating data of the particular data account (e.g., performing transactions related to the account). Thus, the data server 105a may apply a higher weight to a data update initiated by an iPhone® located within the United States than another data update initiated by a Samsung® device located in Czech Republic. Other examples of factors that may not be weighed the same include, but are not limited to, IP address used for the request, date/time of the request, frequency or recency of the request, and type of data being requested for viewing or replacing, where "higher" value data may have a higher weight, e.g., viewing/replacing a password vs. a version number. Thus, when analyzing the causality chains, the data server 105a may further apply different weights to different data updates (different data identifiers) within the causality chain based on additional information that may be extracted from the data write requests associated with the data updates.

In some embodiments, the data server 105a may calculate a score for each data identifier in a causality chain (and also for the data value corresponding to the causality chain) based on the factors (e.g., an identity of the user that initiated the data update, a location of the device that initiated the data update, a type of the device that initiated the data update, etc.) discussed herein. The data server 105a may then calculate, for each data value stored for the particular data field, a causality value based on the calculated scores. For example, the data server 105a may calculate the causality value by adding the calculated scores. The data server 105a may then select the data value having the highest causality value.

Once a data value is selected for the particular data field, the process 500 transmits (at step 535) the selected data value to the requesting device as a response to the data read request. For example, the data server 105a may transmit the data value 'B' to the requesting device (e.g., the user device 154), and may cause the data value 'B' to be displayed on an interface displayed on the user device 154.

Figure 6:
FIG. 6 illustrates another sequence of data operations performed by a distributed data storage system according to an embodiment of the present disclosure.

FIG. 6 illustrates another operation sequence (Operations (1) to Operations (10)) that illustrates the data processing techniques according to various embodiments of the disclosure. Operations (1) to (4) are identical to Operations (1) to (4) of FIG. 4. After the completion of data write operation in Operation (4), the data server 105b includes the data value 'A' and the data value 'B'. The data value 'A' has a data identity of 'x1' and a null causality chain, and the data value 'B' has a data identity of 'y1' and a causality chain that includes the data identity 'x1'.

In Operation (5), the data server 105a receives a data read request corresponding to the particular data field. Since the data server 105a only stores a single data value 'A' corresponding to the particular data field, the data server 105a returns the data value 'A' as a response to the data read request in Operation (5). The data server 105a then receives a data write request (in Operation (6)) for inserting a data value 'C' for the particular data field within the distributed data storage system 100. The data server 105a generates, for the data value 'C', a data identifier. For example, the data server 105a may generate the data identifier using the data server identifier for the data server 105a 'x' and a counter corresponding to the particular data field. Since this is the second time a data value is inserted for this particular data field by the data server 105a, the counter is now at '2'. As such, the data identifier 'x2' is generated for the data value 'C'. The data server 105a then determines that the data value 'C' is intended to replace the data value 'A, based on determining that the data write request in Operation (5) indicates that the data value 'A' is being replaced. As such, the data server 105a generates, for the data value 'C', a causality chain that includes the data identifier of the data value 'A' ('x1').

Furthermore, the data server 105a may extract additional information from the data write request. For example, the data server 105a may determine that the data write request indicates that the user who initiated the data write request is a regular account holder associated with a user account corresponding to the data field being updated. The data server 105a then stores the data value 'C' and its associated information (e.g., the data identifier 'x2', the causality chain that includes 'x1', and the identity of the regular account holder) in the local store 120a for the particular data field.

In Operation (7), the data server 105a receives another data read request corresponding to the particular data field. The data server 105a determines that there are two data values 'A' and 'C' stored for the particular data field. As such, the data server 105a analyzes the causality chains for the values 'A' and 'C' and may determine that the data value 'C' replaces the data value 'A' based on determining that the causality chain of the data value 'C' includes the identifier of the data value 'A'. As such, the data server 105a returns the data value 'C' as a response to the data read request in Operation (7), and removes the data value 'A' from the data server 105a.

In Operation (8), the data server 105a receives yet another data write request for inserting the data value 'D' for the particular data field. Similar to Operation (5), the data server 105a may generate a data identifier 'x3' for the data value 'D'. The data server 105a may also determine that the data value 'D' is a replacement for the data value 'C' (e.g., based on the previous data read request in Operation (7)). Thus, the data server 105a may generate, for the data value 'D', a causality chain that includes the data identifier of the data value 'C' ('x2"). In some embodiments, the data server 105a may also include (e.g., append) the causality chain of the data value 'C' in the causality chain of the data value 'D'. As such, the generated causality chain of the data value 'D' may include 'x1' and 'x2'.

Furthermore, the data server 105a may extract additional information from the data write request in Operation (8). For example, the data server 105a may determine that the data write request indicates that the user who initiated the data write request is a regular account holder associated with a user account corresponding to the data field being updated. The data server 105a then stores the data value 'D' and its associated information (e.g., the data identifier 'x3', the causality chain that includes 'x1' and 'x2', and the identity of the regular account holder) in the local store 120a for the particular data field.

In Operation (9), the distributed data storage system 100 performs a data synchronization operation, which synchronizes data across the multiple data servers of the system 100, including the data servers 105a and 105b. During the data synchronization operation, the data server 105a may transmit the data updates related to the data value 'C' and the data value 'D' for the particular data field to the data server 105b. Similarly, the data server 105b may transmit the data update related to the data value 'A' and the data value 'B' for the particular data field to the data server 105a. Upon completion of the data synchronization process, both of the data servers 105a and 105b would have identical data values for the particular data field. Specifically, each of the data servers 105a and 105b includes the data value 'A', the data value 'B', the data value 'C', the data value 'D' and their associated information for the particular data field.

Figure 7:
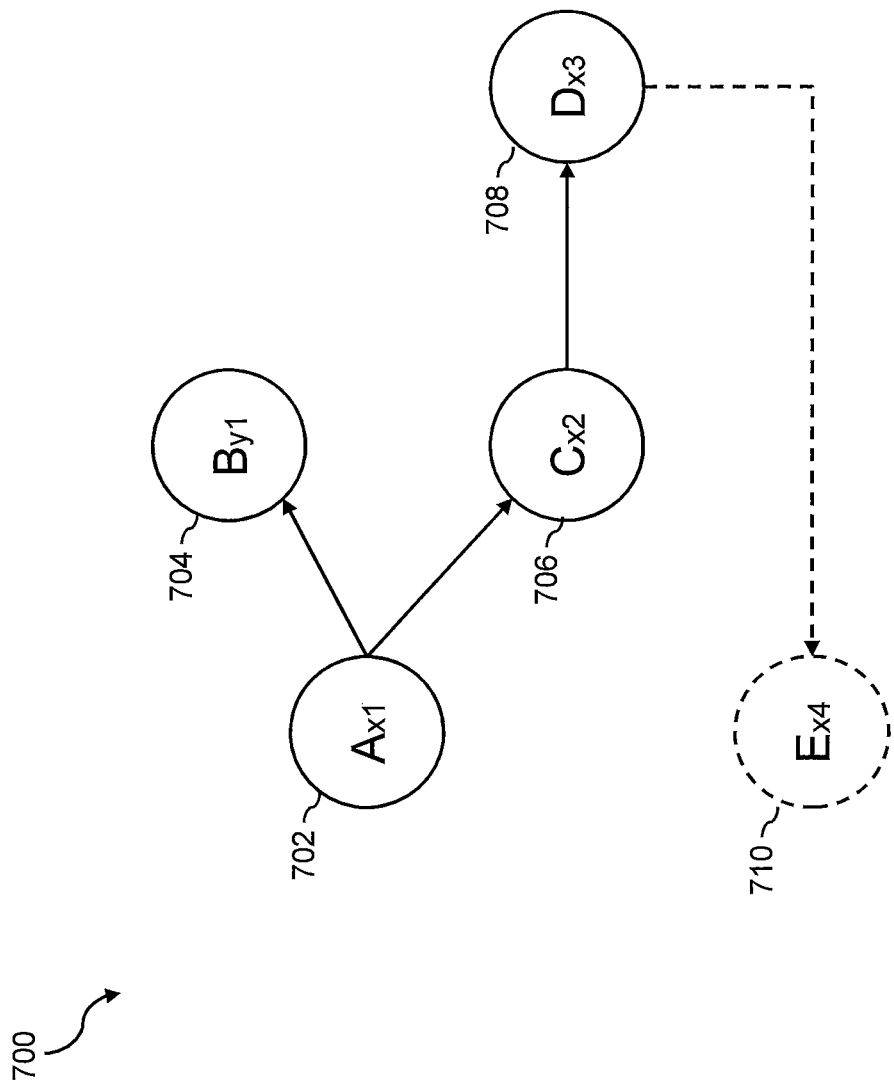
FIG. 7 is a graph illustrating a data replacement history for a data field according to an embodiment of the present disclosure.

In Operation (10), the data server 105a receives a data read request for the particular data field. Since the data server 105a determines that multiple data values are included for the particular data field, the data server 105a may select one of the data values for responding to the data read request. For example, the data server 105a selects the data value for responding to the data read request by analyzing the causality chains of the data values included in the particular data field. In some embodiments, the data server 105a may analyze the causality links by generating a causality graph that represents the data update history (sequence) for the particular data field. FIG. 7 illustrates a causality graph 700 based on the causality chains associated with the data value 'A', the data value 'B', the data value 'C', and the data value 'D'. As shown, the causality graph 700 includes a node 702 representing the data value 'A'. The node 702 is connected to a node 704 (representing the data value 'B') and a node 706 (representing the data value 'C'), indicating that the data value 'A' has been replaced by the data value 'B' and the data value 'C' in different instances. As shown in the causality graph 700, it is possible that a data value may be replaced by different data values. For example, the data value may be replaced by different data servers before a data synchronization process is performed (e.g., in Operation (4) and Operation (5) respectively). The node 706 is connected to a node 708 (representing the data value 'D'), indicating that the data value 'C' has been replaced by the data value 'D'. Based on the causality graph 700, the data server 105a may eliminate the data value 'A' and the data value 'C' from the selection, as they have been replaced by other data values.

The data server 105a may apply the selection methods disclosed herein to select one of the remaining data values (the data value 'B' and the data value 'D') based on their causality chains. As discussed above, the data server 105a of some embodiments may select the data value having the longest causality chain. Using this criteria, the data server 105a may select the data value 'D' for responding to the data read request as the causality chain of the data value 'D' includes two other data values, while the causality chain of the data value 'B' includes only one data value.

In some embodiments, the data server 105a may apply different weights to different users who initiated the data updates. For example, the data server 105a may give a higher weight (e.g., 30 points) to each data update initiated by an administrator, while giving a lower weight (e.g., 10 points) to each data update initiated by a regular account holder. As such, the data server 105a may assign a score for each data update represented in a causality chain, and the data update of the data value itself. Consider an example in which the data updates performed by the data server 105a were all initiated by a regular account holder, while the data update performed by the data server 105b was initiated by an administrator. For the data value 'B', the data server 105a may consider the branch that includes the nodes 702 and 704. The data server 105a may assign 10 points for the node 702 and 30 points for the node 704. Thus, the data server 105a may calculate a total of 40 points for the data value 'B'. For the data value 'D', the data server 105a may consider the branch that includes the nodes 702, 706, and 708. Since all of the data values 'A', 'C', and 'D' were initiated by the regular account holder, each of the nodes 702, 706, and 708 is assigned with 10 points. The data server 105a may then calculate a total of 30 points for the data value 'D'. Thus, using the selection criteria described above, the data server 105a may select the data value 'B' for responding to the data read request.

In some embodiments, in addition to eliminating data values that have been replaced, the data server 105a may also eliminate data values that have been superseded by another data value. Consider an example in which a data value 'E' is inserted for the particular data field (e.g., in Operation (9)) by the data server 105a. The data server 105a may generate a data identifier 'x4' for the data value 'E', since this is the fourth data value being inserted for the particular data field by the data server 105a. However, there may not be any indication that the data value 'E' is a replacement of another existing data value for the particular data field. As such, the data server 105a may generate a null causality chain for the data value 'E'. In this example, the data server 105a may not be able to eliminate any data value for the particular data field based on the null causality chain of the data value 'E'. However, by analyzing the data identifiers of the data values for the particular data field, the data server 105a may determine that the data value 'E' supersedes the data values 'A', 'C', and 'D', as all of the data values 'A', 'C', 'D', and 'E' were inserted for the particular data field by the same data server 105a and the version portion of the data identifier of the data value 'E' (4) is larger than the version portions of the data identifiers for the data values 'A', 'C', and 'D'. Thus, the data server 105a may further eliminate the data value 'D' in this example. Once the data server 105a selects a single data value for the particular field, the data server 105a transmits the selected data value to the requesting device (e.g., the user device 152) as a response to the data read request in Operation (8).

Figure 8:
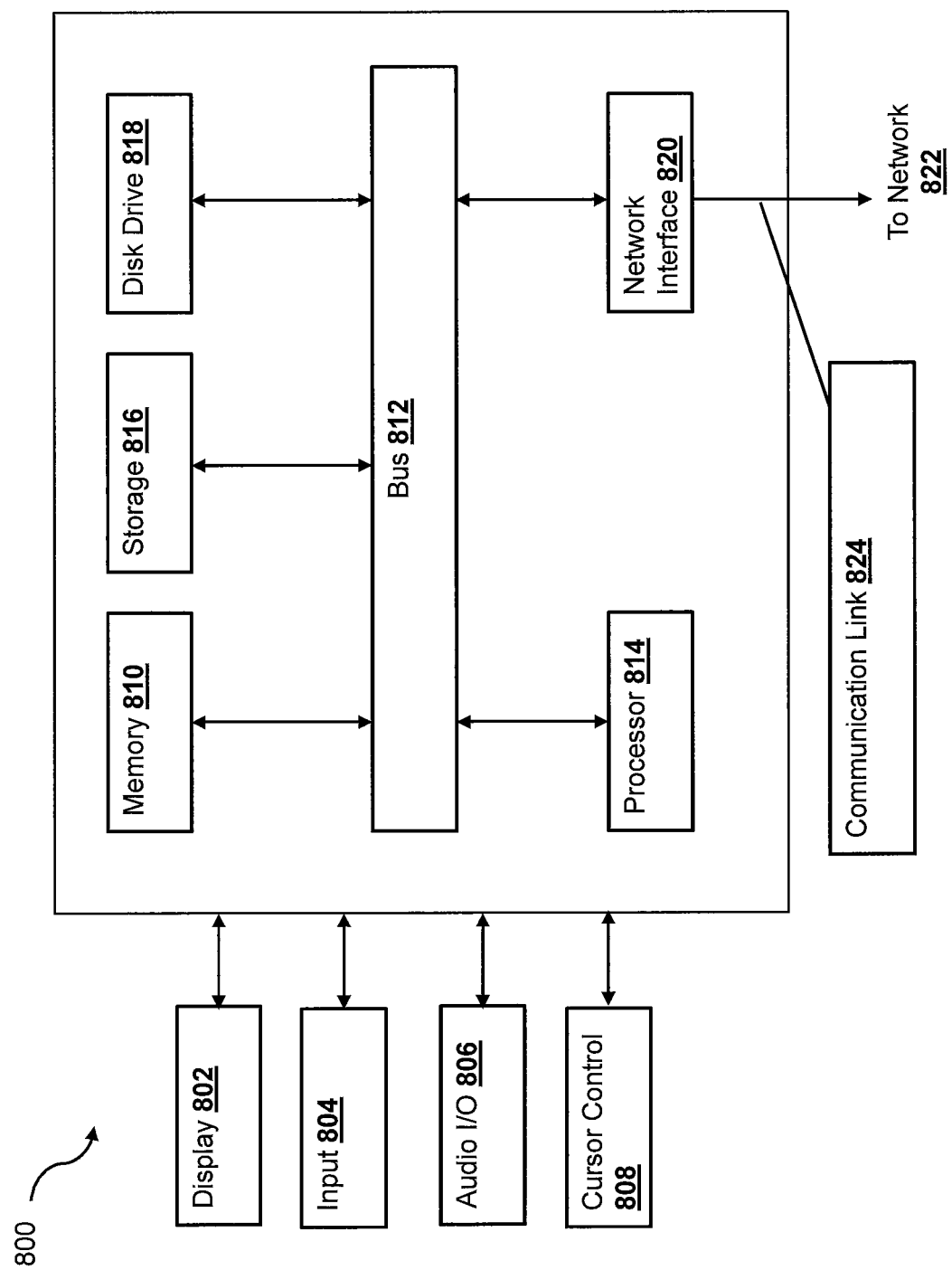
FIG. 8 is a block diagram of a system for implementing a device according to an embodiment of the present disclosure.

FIG. 8 is a block diagram of a computer system 800 suitable for implementing one or more embodiments of the present disclosure, including the data servers 105a and 105b, and the user devices 152 and 154. In various implementations, each of the user devices 152 and 154 may include a mobile cellular phone, personal computer (PC), laptop, wearable computing device, etc. adapted for wireless communication, and each of the data servers 105a and 105b may include a network computing device, such as a server. Thus, it should be appreciated that the devices 105a, 105b, 152, and 154 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account, a page for initiating one or more electronic transactions that may trigger one or more data access requests for the distributed data storage system 100. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another data server or another user device, via network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid state drive, a hard drive). The computer system 800 performs specific operations by the processor 814 and other components by executing one or more sequences of instructions contained in the system memory component 810. For example, the processor 814 can perform the data access operations described herein according to the processes 300 and 500.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
receiving, from a remote device, a data read request comprising a data key;
in response to receiving the data read request, retrieving, from a first data store based on the data key, a plurality of data objects comprising at least a first data object and a second data object, wherein the first data object comprises a first data value and a first causality chain indicating a first data update history corresponding to the first data value, wherein the second data object comprises a second data value and a second causality chain indicating a second data update history corresponding to the second data value;
determining that the first data object and the second data object are not replacements of each other for the data key based on the first causality chain and the second causality chain;
selecting, from among the plurality of data objects corresponding to the data key, the first data object for responding to the data read request based at least in part on a comparison between the first causality chain and the second causality chain; and
transmitting the first data value of the first data object to the remote device as a response to the data read request.

2. The system of claim 1, wherein the plurality of data objects further comprise a third data object having a third data value and a third causality chain indicating a third data update history corresponding to the third data value, wherein the operations further comprise:
determining that the first data object is a replacement of the third data object based on a determination that the first causality chain comprises a link to the third data object; and
in response to determining that the first data object is a replacement of the third data object, removing the third data object from the first data store.

3. The system of claim 1, wherein determining that the first data object and the second data object are not replacements of each other for the data key comprises:
determining that the second causality chain comprises no link to the first data object; and
determining that the first causality chain comprises no link to the second data object.

4. The system of claim 1, wherein selecting the first data object for responding to the data read request comprises calculating, for the first causality chain, a first score based at least in part on a first number of data updates represented in the first data update history.

5. The system of claim 4, wherein the first score is calculated further based on an identity of a user who performed a data update according to the first data update history.

6. The system of claim 5, wherein the first score is calculated further based on the first data value.

7. The system of claim 1, wherein the operations further comprise synchronizing the first data store with a second data store by:
retrieving, from the second data store, a first subset of data objects corresponding to the data key, wherein the first subset of data objects comprises the second data object;
compiling the first subset of data objects with a second subset of data objects corresponding to the data key and pre-existed in the first data store; and
storing, in the first data store for the data key, the compiled first subset of data objects and second subset of data objects.

8. The system of claim 1, wherein the operations further comprise:
receiving, from a second remote device, a data write request comprising the data key and a third data value;
determining that the third data value is a replacement of the first data value based on the data write request;
generating a third data object comprising the third data value and a third causality chain comprising a link to the first data object; and
storing the third data object in the first data store.

9. The system of claim 1, wherein the data key corresponds to a status of a user account.

10. A method comprising:
receiving, by one or more hardware processors from a remote device, a data read request comprising a data key;
in response to receiving the data read request, retrieving, by the one or more hardware processors from a first data store based on the data key, a plurality of data objects comprising at least a first data object and a second data object, wherein the first data object comprises a first data value and a first causality chain indicating a first data update history corresponding to the first data value, wherein the second data object comprises a second data value and a second causality chain indicating a second data update history corresponding to the second data value;
determining that the first data object is a replacement of the second data object based on a determination that the first causality chain comprises a link to the second data object;
in response to the determining, removing the second data object from the first data store; and
transmitting the first data value of the first data object to the remote device as a response to the data read request based at least in part on the removing of the second data object.

11. The method of claim 10, wherein the first causality chain is different from the second causality chain.

12. The method of claim 10, wherein the plurality of data objects further comprises a third data object having a third data value and a third causality chain indicating a third data update history corresponding to the third data value, wherein the operations further comprise:
determining that the first data object and the third data object are not replacement of each other.

13. The method of claim 12, further comprising in response to determining that the first data object and the third data object are not replacement of each other:

calculating a first score for the first data object based on the first causality chain;

calculating a third score for the third data object based on the third causality chain; and selecting the first data object for responding to the data read request based on a comparison between the first score and the third score.

14. The method of claim 13, wherein the first score is calculated based at least in part on a number of linked data objects included in the first causality chain.

15. The method of claim 14, wherein the first score is calculated further based on an identity of a user who performed a data update for the data key according to the first data update history.

16. The method of claim 12, wherein determining that the first data object and the third data object are not replacement of each other comprise:

determining that the third causality chain comprises no link to the first data object; and determining that the first causality chain comprises no link to the third data object.

17. The method of claim 10, further comprising synchronizing the first data store with a second data store by:

retrieving, from the second data store, a first subset of data objects corresponding to the data key, wherein the first subset of data objects comprises the second data object;

compiling the first subset of data objects with a second subset of data objects corresponding to the data key and pre-existed in the first data store; and storing, in the first data store for the data key, the compiled first subset of data objects and second subset of data objects.

18. A non-transitory machine readable medium having stored thereon machine-readable instructions executable to cause a machine to perform operations comprising:

receiving, from a remote device, a data write request comprising a data key and a first data value;

determining that the first data value is for a replacement of a stored second data value for a data field corresponding to the data key, wherein the stored second data value is stored in a local data store for the data field;

in response to determining that the first data value is for a replacement of the stored second data value, generating, for the first data value, a first causality chain representing a link between the first data value and the second data value;

incorporating a second causality chain corresponding to the stored second data value into the first causality chain;

storing the first data value and the first causality chain in the local data store for the data field; and transmitting, to the remote device, a notification that the data write request has been processed.

19. The non-transitory machine readable medium of claim 18, wherein determining that the first data value is for a replacement of the stored second data value comprises:

determining that a data read request associated with the data field was received within a predetermined duration prior to receiving the data write request; and determining that the stored second data value was transmitted as a response to the data read request.

20. The non-transitory machine readable medium of claim 18, wherein the first data value and the first causality chain is stored in the local data store without removing the second data value from the local data store.

\* \* \* \* \*

UNITED STATES PATENT AND TRADEMARK OFFICE
CERTIFICATE OF CORRECTION

PATENT NO. : 10,810,166 B2
APPLICATION NO. : 16/136770
DATED : October 20, 2020
INVENTOR(S) : Junaid Zaheer Jaswal and Dmitry Martyanov It is certified that error appears in the above-identified patent and that said Letters Patent is hereby corrected as shown below:

In the Specification

Column 13, Line 30, please correct as follows:
value 'A' has been replaced by the data value 'B', and eliminate Signed and Sealed this
Eighth Day of December, 2020

Andrei Iancu
*Director of the United States Patent and Trademark Office*